US010841976B2

(12) United States Patent
Ferrari

(10) Patent No.: US 10,841,976 B2
(45) Date of Patent: Nov. 17, 2020

(54) COMMUNICATION DEVICE WITH WIRELESS INTERFACE USING DIFFERENT PROTOCOLS

(71) Applicant: SONOVA AG, Staefa (CH)

(72) Inventor: Federico Ferrari, Bern (CH)

(73) Assignee: Advanced Bionics AG, Staefa (CH)

(*) Notice: Subject to any disclaimer, the term of this patent is extended or adjusted under 35 U.S.C. 154(b) by 0 days.

(21) Appl. No.: 16/632,597

(22) PCT Filed: Jul. 26, 2017

(86) PCT No.: PCT/EP2017/068897
§ 371 (c)(1),
(2) Date: Jan. 21, 2020

(87) PCT Pub. No.: WO2019/020181
PCT Pub. Date: Jan. 31, 2019

(65) Prior Publication Data
US 2020/0245411 A1 Jul. 30, 2020

(51) Int. Cl.
H04R 25/00 (2006.01)
H04B 1/715 (2011.01)
(Continued)

(52) U.S. Cl.
CPC ............ *H04W 88/06* (2013.01); *H04B 1/715* (2013.01); *H04R 25/552* (2013.01);
(Continued)

(58) Field of Classification Search
CPC ...... H04Q 7/20; H04M 1/00; H04M 2250/06; H04M 1/6066; H04M 2250/02;
(Continued)

(56) References Cited

U.S. PATENT DOCUMENTS 7,020,467 B2 * 3/2006 Tada ................. H04W 52/0232
455/434
7,440,484 B2 10/2008 Schmidl et al.
(Continued)

FOREIGN PATENT DOCUMENTS

EP 1392023 A3 * 6/2004 ............ H04W 16/14
EP 1964371 9/2008
(Continued)

OTHER PUBLICATIONS

International Search Report and Written Opinion received in International Application No. PCT/US17/068897, dated Apr. 4, 2018.

*Primary Examiner* — Pablo N Tran
(74) *Attorney, Agent, or Firm* — ALG Intellectual Property, LLC

(57) ABSTRACT

A communication device comprises a wireless data interface including a radio transceiver and a controller for controlling the transceiver according to a first frequency hopping protocol comprising a first plurality of frequency channels within a first frequency range and according to a second frequency hopping protocol comprising a second plurality of frequency channels within a second frequency range, wherein the first frequency range and the second frequency range overlap at least in part. The controller is configured to temporarily disable part of the frequency channels for the first protocol in case that radio interference is recognized for those frequency channels, with the disabled frequency channels for that first protocol being stored. The controller is also configured to retrieve the disabled frequency channels of the first protocol and to disable, at least for a predetermined initial time period, at least part of those disabled frequency channels also for the second protocol.

14 Claims, 3 Drawing Sheets

(51) Int. Cl.
*H04B 7/00* (2006.01)
*H04M 1/00* (2006.01)
*H04W 88/06* (2009.01)
*H04W 4/80* (2018.01)
*H04W 16/14* (2009.01)

(52) U.S. Cl.
CPC ............ *H04R 25/554* (2013.01); *H04W 4/80* (2018.02); *H04W 16/14* (2013.01); *H04B 2001/7154* (2013.01); *H04R 2225/55* (2013.01)

(58) Field of Classification Search
CPC .... H04B 1/38; H04W 72/0446; H04W 16/14; H04W 88/06; H04W 36/28; H04W 8/005; H04W 4/80; H04R 25/554; H04R 25/552; H04R 2225/021; H04R 2225/023; H04R 2225/025; H04R 2225/51
See application file for complete search history.

(56) References Cited

U.S. PATENT DOCUMENTS

| | | | |
|---|---|---|---|
| 9,210,520 B2* | 12/2015 | Solum | H04R 25/505 |
| 9,374,713 B2 | 6/2016 | Chan | |
| 9,504,076 B2* | 11/2016 | El-Hoiydi | H04W 84/18 |
| 9,668,070 B2* | 5/2017 | El-Hoiydi | H04R 25/554 |
| 10,165,192 B2* | 12/2018 | Oshima | H04L 67/146 |
| 10,306,380 B2* | 5/2019 | Roeck | H04R 25/552 |
| 10,623,869 B2* | 4/2020 | Solum | H04B 17/309 |
| 2006/0292986 A1* | 12/2006 | Bitran | H04W 16/14 455/41.2 |
| 2009/0137235 A1 | 5/2009 | Schmidt et al. | |
| 2013/0223663 A1 | 8/2013 | Roos et al. | |
| 2017/0105076 A1* | 4/2017 | Gehring | H04R 25/305 |

FOREIGN PATENT DOCUMENTS

| | | | | |
|---|---|---|---|---|
| EP | 2611236 A1 * | 7/2013 | | H04W 76/28 |
| WO | WO-2007027465 A1 * | 3/2007 | | H04W 68/00 |

* cited by examiner

COMMUNICATION DEVICE WITH WIRELESS INTERFACE USING DIFFERENT PROTOCOLS

The invention relates to a communication device comprising a wireless data interface including a short-range audio transceiver and a controller for controlling the transceiver according to different protocols.

Generally, wireless protocols define a band in the frequency spectrum that can be used by the devices using that wireless protocol for communication. During operation the devices using a certain wireless protocol typically perform frequency hopping and select a subset of the frequency band assigned to the protocol to maximize robustness against wireless interference. The frequency selection is usually based on frequency quality estimations performed by any of the devices participating in the communication using the protocol.

Typically a protocol assesses the current quality of frequencies in the band by collecting information of successful or failed packet transmissions and receptions and/or by periodically measuring the signal strength (e.g. Received Signal Strength Indicator ("RSSI")) to detect frequencies with high noise level.

In case that a wireless device uses two different protocols wherein the frequency bands of the two protocols overlap at least in part, there may not be only external interference caused by co-located third party networks, but there may be additional mutual interference caused by concurrent operation of the two protocols. To minimize such mutual interference, different frequency subsets may be selected for each supported protocol.

U.S. Pat. No. 9,374,713 B2 relates to a non-Bluetooth device operating in a same frequency band as Bluetooth devices, wherein the device detects frequency hopping sequences utilized by one or more Bluetooth communication devices in the vicinity of the non-Bluetooth device, with the non-Bluetooth device avoiding such detected frequency hopping sequences to avoid interference with the Bluetooth communication.

U.S. Pat. No. 7,440,484 B2 relates to a wireless dual mode device which may operate both in a Bluetooth network and a different type of network, such as a WLAN. The device may use its knowledge of both of the networks to allocate some of the frequency channels to the WLAN activity and some or all of the other available frequency channels to the Bluetooth network so as to minimize interference.

It is an objective of the disclosure to overcome the drawbacks of the prior art and provide an improved communication device. In some embodiments of this disclosure, the disclosure provides for a communication device comprising a wireless interface using protocols with overlapping frequency ranges, wherein radio interference should be reduced in a particularly efficient manner. It is a further object of the disclosure to provide for a method using such communication device.

According to some embodiments of the disclosure, these objects are achieved by a communication device as defined in claim 1 and a method as defined in claim 10, respectively.

The disclosure is beneficial in that the information collected by the previously used one of the protocols concerning external interference can be used immediately when, e.g., audio streaming by the other one of the protocols starts; otherwise, it would take at least a few seconds until the protocol starting, e.g., audio streaming has detected external interferers and has removed the respective noisy frequency channels. Thus, the present invention may help to optimize the quality of an initial phase of, e.g., an audio stream in the presence of external interference.

Some embodiments of the disclosure are defined in the dependent claims.

Examples of the disclosure will be illustrated by reference to the attached drawings, wherein.

Figure 1:
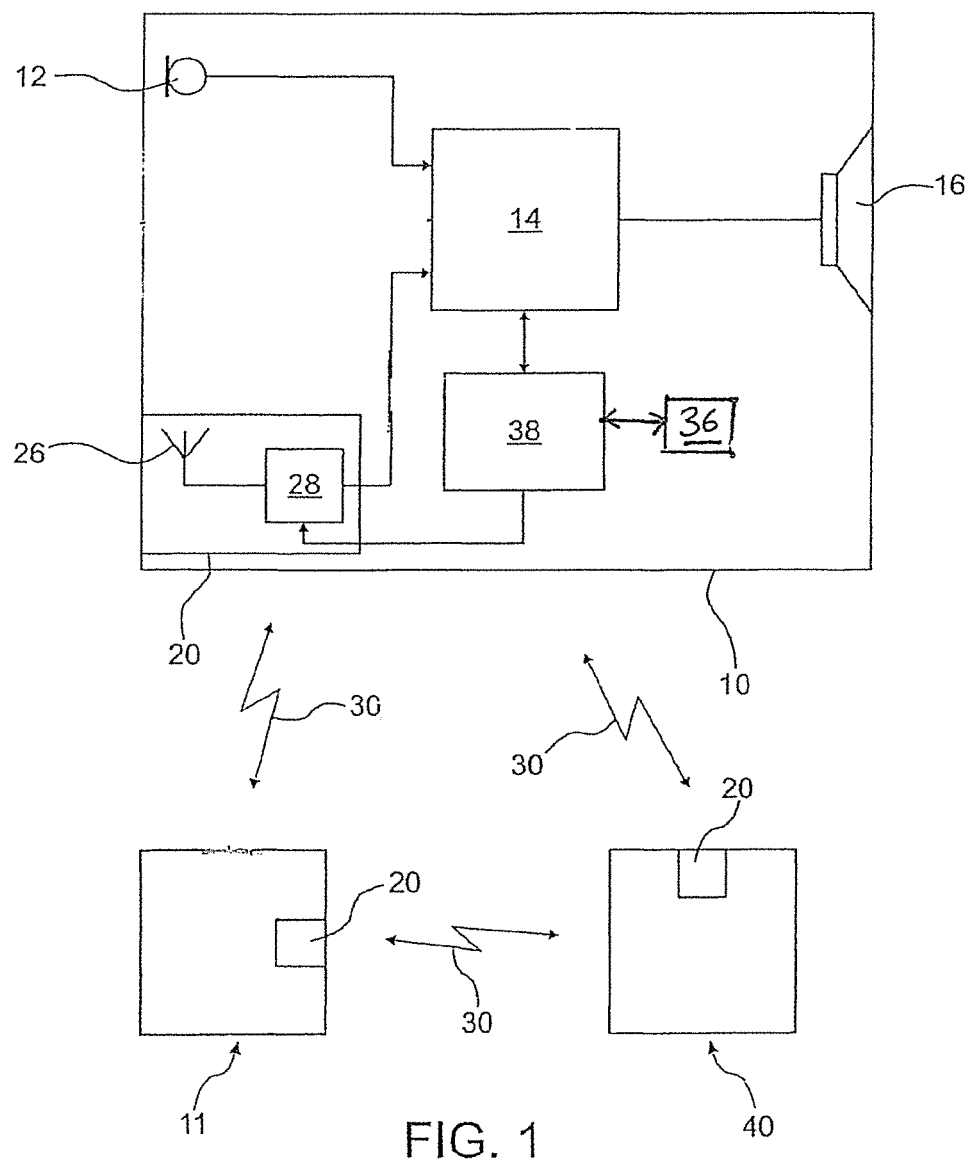
FIG. 1 is a schematic block diagram of an example of a hearing device to be used with the disclosure.

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

An audio stream may include audio data only or audio data of the audio stream may be part of a media stream including audio and video data, e.g., the audio stream also may include video data. Typically, an audio stream is transmitted from an audio source to a plurality of audio sinks by broadcasting, e.g., the audio source acts as a broadcasting device that unidirectionally sends information to the receiver devices, wherein the receiver devices cannot provide feedback to the broadcasting device as to whether the information was received, e.g., there is no uplink. Additionally, a communication device is an electric device configured to wirelessly communicate or to communicate with a wire.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory medium excludes a propagating signal. In some embodiments, the devices disclosed in FIGS. 1 and 2 perform some or all of the operations described in FIGS. 3 and 5.

FIG. 1 is a block diagram of an example of a first hearing device 10 to be worn at one ear of a user that typically is used together with a second hearing device 11 to be worn at the other ear of the user. The first and second hearing devices 10 and 11 are ear level devices and together form a binaural hearing system. In some implementations, the hearing devices 10 and 11 are hearing instruments, such as RIC (receiver in the canal), BTE (behind-the-ear), ITE (in-the-ear), ITC (in the canal) or CIC (completely-in-the-canal) hearing aids. In other implementations, the hearing devices are an auditory prosthesis, such as a cochlear implant device comprising an implanted cochlear stimulator and an external sound processor that can be designed as a BTE unit with a headpiece or as an integrated headpiece.

In the example of FIG. 1, the hearing devices 10 and 11 are hearing aids comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals (these elements are shown in FIG. 1 only for the hearing aid 10). For example, the audio signal processing in the unit 14 may include acoustic beamforming (in this case, the microphone arrangement 12 comprises at least two spaced apart microphones).

The hearing aids 10 and 11 comprise a wireless interface 20 comprising an antenna 26 and a transceiver 28. The interface 20 is provided for enabling wireless data exchange between the first hearing aid 10 and the second hearing aid 11 via a wireless link 30 which serves to realize a binaural hearing assistance system, allowing the hearing aids 10 and 11 to exchange audio signals and/or control data and status data, such as the present settings of the hearing aids 10 and 11.

The interface 20 is also provided for data exchange via a wireless link 30 from or to an external device 40, for example for receiving an audio data stream from an external device acting as an audio source, or data from a remote control device.

The hearing aids 10 and 11 also comprise a control unit 38 for controlling operation of the hearing aids 10 and 11, with the control unit 38 acting on the signal processing unit 14 and the transceiver 28, and a memory 36 for storing data required for operation of the hearing aids 10 and 11 and data required for operation of the interface 20, such as pairing/network data.

Figure 2:
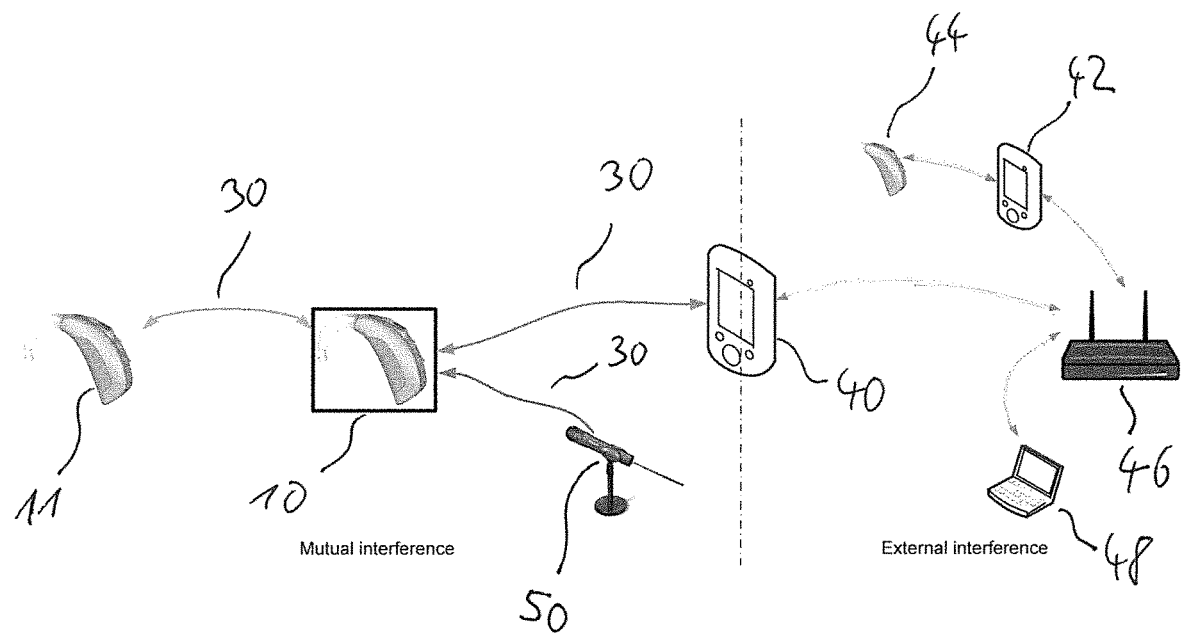
FIG. 2 is an illustration of an example of a use situation of a hearing device with a plurality of other wireless devices.

According to the example of FIG. 2, the hearing device 10 may be connected not only to its binaural counterpart 11 but also to external devices like a smartphone 40 and a wireless microphone 50. In addition, there may be other wireless devices, like a further hearing device 44, a further smartphone 42, a WLAN router 46 and a notebook computer 48. All of these wireless connections may use partially or completely overlapping frequency bands.

The hearing device 10, more precisely its wireless interface 20 including the transceiver 28, is configured to use a first frequency hopping protocol suitable for audio streaming and comprising a first plurality of frequency channels within a first frequency range and a second frequency hopping protocol suitable for audio streaming and comprising a second plurality of frequency channels within a second frequency range, wherein the first frequency range and the second frequency range overlap in part. For example, both protocols may use the 2.4 GHz ISM band. In some implementations, at least one of the protocols is a Bluetooth protocol.

As already mentioned above, a wireless protocol using frequency hopping typically assesses the current quality of frequencies in the band by collecting information of successful or failed packet transmissions and repetitions and/or by periodically measuring the signal strength (e.g., RSSI) to detect the frequency channels with high noise level. The amount of information that a protocol collects concerning "bad" frequencies (e.g., frequencies with high rate of failed packet transmissions and receptions and/or frequencies with high noise level) depends on the current operating mode of the protocol.

Typically, two main modes can be distinguished, namely a low power mode where no audio stream is transferred and a high power mode where a connection is actively used to exchange relatively large amounts of data to transfer an audio stream. In the low power mode the main goal is to reduce power consumption (e.g., minimize power consumption) to establish a new connection and/or maintain one or more existing connections. In the low power mode the device communicates rarely using this protocol and cannot afford to perform periodically frequency assessments of the current frequency qualities, so that in the low power mode the protocol is able to collect only little information concerning the current frequency channel qualities. By contrast, in the high power mode the device communicates often using this protocol and therefore collects a high amount of up-to-date information on the current frequency channel qualities.

As a consequence, a protocol that has just switched from a low power mode to a high power mode to start transfer of an audio stream has only little information on the quality of the frequency channels of the protocol and therefore is prone to use frequencies having high noise level, e.g., frequencies that are affected by external radio interference. Typically, it takes some time until frequency quality estimation starts to provide meaningful results (for example, it may take several seconds) after the protocol has entered the high power mode due to the start of the audio streaming. Thus, there may be some intermediate time interval after starting of audio streaming during which the protocol may have suboptimal performance (for example, resulting in audio interruptions or presence of artefacts) due to packet loss on frequencies affected by external interference that have not yet been identified as "bad" frequencies.

Figure 3:
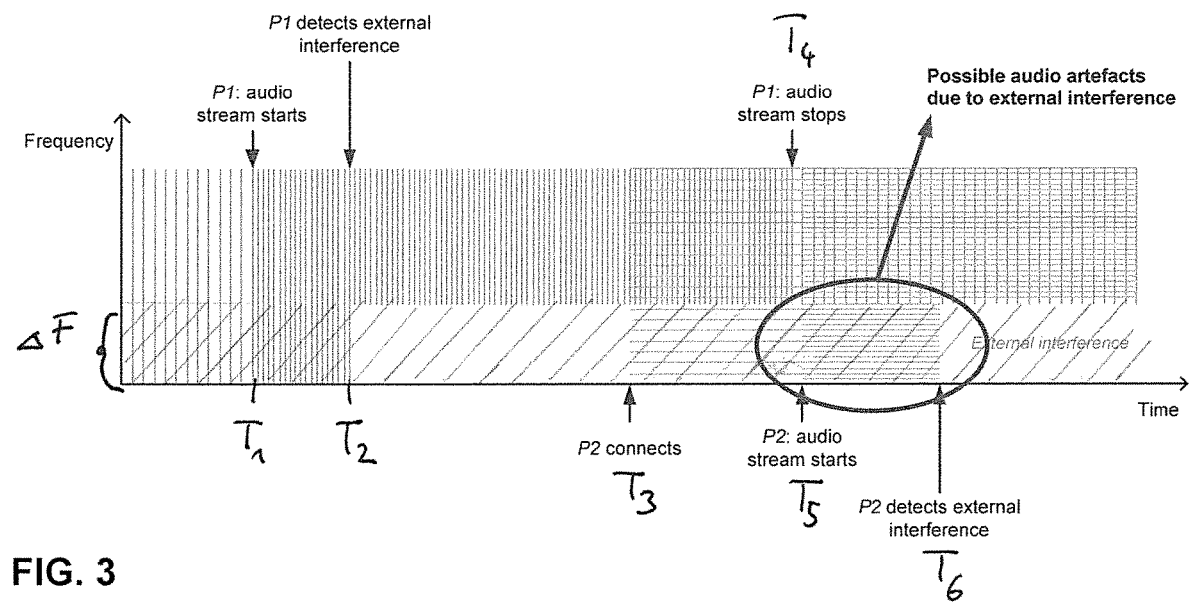
FIG. 3 is an illustration of an example of audio streaming by a hearing device using subsequently two different frequency hopping protocols, when not employing the disclosure.

An example of this problem is illustrated in FIG. 3, wherein a device uses first a first protocol P1 for audio streaming and later switches to a second protocol P2 for audio streaming. Initially, the device uses the protocol P1 for connecting to another device in a low power mode, until at time T1 the device starts an audio stream by using the protocol P1, which then is operated in a high power mode. At time T2 the protocol P1 detects an external interference affecting frequencies within a range of ΔF and then is no longer used in the frequency hopping scheme. At time T3 the device uses a second protocol P2 for connecting to the same or another external device, i.e. the second protocol P2 is used in a low power mode and may use all frequency channels allocated to the second protocol P2 (in the example of FIG. 3, the second protocol P2 uses the same frequency band as the first protocol P1). However, since the second protocol P2 is not aware of external interference and is not able to detect external interference in the low power mode, the second protocol P2 may also use frequencies in the frequency range ΔF affected by external interference. At time T4 audio streaming using the first protocol P1 is stopped and shortly afterwards, at T5, audio streaming is resumed by now using the second protocol P2.

Since protocol P2 now is in a high power mode, it can start at T5 to collect information concerning "bad" frequencies, but it will take some time until at T6 the second protocol P2 has detected the external interference affecting the frequencies ΔF, so that from T6 on the second protocol P2 will no longer use frequencies within the range ΔF. However, during the initial audio streaming period between T5 and T6 the protocol P2 may also use "bad" frequencies within the frequency range ΔF affected by the external interference, so that during this initial time period audio quality may be deteriorated by packet loss or artefacts.

Figure 4:
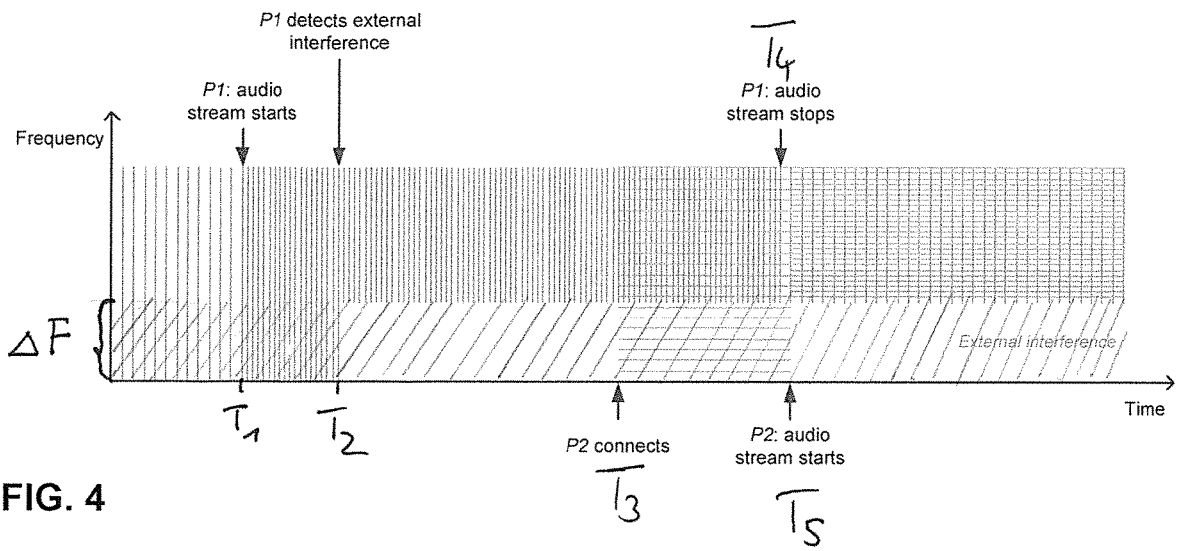
FIG. 4 is an illustration like FIG. 3, wherein, however, the disclosure is employed by the hearing device.

In FIG. 4 a modification of the example of FIG. 3 is shown, wherein the information obtained by the first protocol P1 concerning "bad" frequencies within ΔF is made available to and is used by the second protocol P2 when starting audio streaming at T5, so that also the second protocol P2 may avoid external interference in the frequency range ΔF from the very beginning of its audio streaming activity on, i.e. from T5 on, thereby avoiding deterioration of the audio quality by the external interference in the range ΔF.

To implement the example of FIG. 4, the controller 38 of the hearing device 10, at the beginning of the audio streaming by using the second protocol P2 (at T5), retrieves the disabled frequency channels of the protocol previously used for audio streaming (i.e. the protocol P1) and disables all or a part of those disabled frequency channels also for the protocol by which audio streaming is to be started (for the second protocol P2). Typically, such automatic disabling of frequency channels that are known to be "bad" in the protocol previously used for audio streaming in particular makes sense in case that such frequency interference information is up-to-date and hence is still meaningful. Therefore, the controller 38 checks whether, at the time of starting audio streaming by the second protocol, the time interval having passed since the last use of the first protocol for audio streaming is shorter than a predetermined correlation time period; in some implementations, the length of such correlation time period is from 0 to 30 seconds.

In some implementations of the disclosure, the automatic disabling of "bad" frequencies of the first protocol also in the second protocol takes place at least for a certain initial time period, which can have a length of from 1 to 30 seconds. In some implementations, after lapse of such initial time period, all disabled frequency channels (i.e. the disabled frequency channels known to be "bad" from the first protocol) are enabled.

Figure 5:
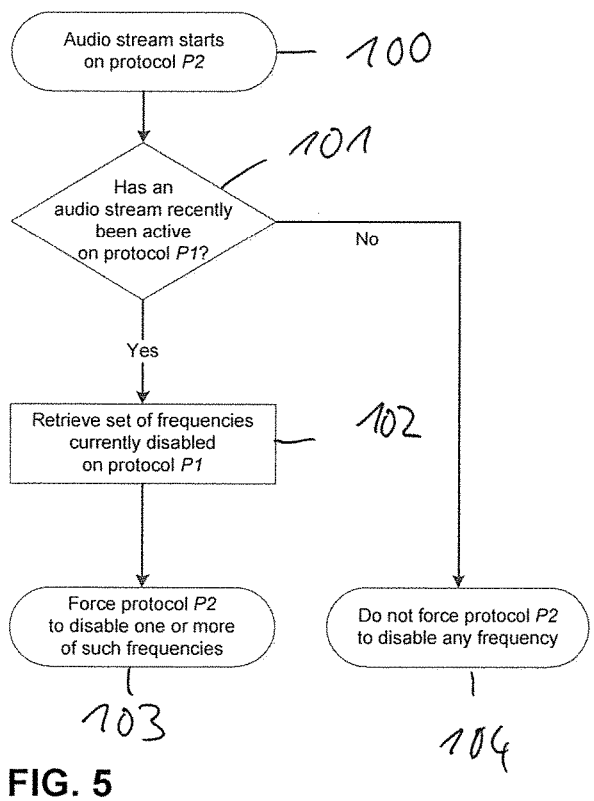
FIG. 5 is a flowchart of an example of an interference reduction procedure according to the disclosure.

In FIG. 5 a flowchart of the example of FIG. 4 is illustrated, wherein in step 100 audio streaming using protocol P2 starts (corresponding to time T5 in FIG. 4), with the controller 38 determining whether an audio stream has been recently active on the first protocol P1 (step 101; "recently" means that the time having passed since the last use of P1 for audio streaming is shorter than a predetermined correlation time period). If the answer is "yes", the controller 38 retrieves the set of frequencies (ΔF in FIG. 4) that are currently disabled on protocol P1 (step 102). As a consequence, the controller 38 forces the protocol P2 to disable, at least for a certain initial time period, one or more of these "bad" frequencies (step 103). In case that the answer to the question in step 101 is "no", e.g. if there is no valid/meaningful frequency quality estimation available, the controller 38 does not force the protocol P2 to disable any frequencies (step 104).

It is to be understood that the wireless interface 20 of the hearing device 10 may use more than two different frequency hopping protocols.

Typically, in a multi-protocol hearing device there is at most one active audio stream at a time, which means that while one of the protocols is in a high power operating mode transferring an audio stream all other protocols are in a low power operating mode. Thus, at most one protocol at a time has up-to-date and meaningful frequency quality estimations (due to its operation in a high-power mode). It is to be noted that mutual interference among various supported protocols has little impact on such frequency quality estimations, which implies that if the active protocol disables one or more frequencies due to high interference then these frequencies are most likely affected by high external interference. Consequently, it is to be expected that audio quality can be improved by providing the interference information collected by the active protocol to a protocol that starts audio streaming.

It is to be understood that the disclosure is applicable not only for data streams comprising exclusively or primarily audio data but also for data streams having little of no audio content. For example, the disclosure is also applicable to video streams which may or may not include audio data.

The invention claimed is:

1. A communication device comprising a wireless data interface including a radio transceiver and a controller for controlling the transceiver according to a first frequency hopping protocol comprising a first plurality of frequency channels within a first frequency range and according to a second frequency hopping protocol comprising a second plurality of frequency channels within a second frequency range, wherein the first frequency range and the second frequency range overlap at least in part;
   wherein the controller is configured to temporarily disable part of the frequency channels for the first protocol in case that radio interference is recognized for those frequency channels, with the disabled frequency channels for that first protocol being stored; and
   wherein the controller is configured to retrieve the disabled frequency channels of the first protocol and to disable, at least for a predetermined initial time period, at least part of those disabled frequency channels also for the second protocol.

2. The communication device of claim 1, wherein the first protocol is a Bluetooth protocol.

3. The communication device of claim 1, wherein the second protocol is suitable for audio streaming.

4. The communication device of claim 3, wherein the controller is configured to retrieve the disabled frequency channels of the first protocol in case that the time interval having passed since the last use of the first protocol for audio streaming is shorter than a predetermined correlation time period at the time when audio streaming by the second protocol is to be started.

5. The communication device of claim 4, wherein the length of the correlation time period is from 0 to 30 seconds.

6. The communication device of claim 4, wherein the predetermined initial time period is from 1 to 30 seconds.

7. The communication device of claim 1, wherein after the initial time period has lapsed, all disabled frequency channels are enabled.

8. The communication device of claim 1, wherein the communication device is a hearing device.

9. The communication device of claim 8, wherein the hearing device is a headset.

10. The communication device of claim 8, wherein the hearing device is a hearing instrument.

11. The communication device of claim 10, wherein the hearing instrument is a hearing aid or an auditory prosthesis device.

12. A system comprising:
a hearing device comprising a wireless data interface including a radio transceiver and a controller for controlling the transceiver according to a first frequency hopping protocol comprising a first plurality of frequency channels within a first frequency range and according to a second frequency hopping protocol comprising a second plurality of frequency channels within a second frequency range, wherein
the first frequency range and the second frequency range overlap at least in part;
the controller is configured to temporarily disable part of the frequency channels for the first protocol in case that radio interference is recognized for those frequency channels, with the disabled frequency channels for that first protocol being stored; and
the controller is configured to retrieve the disabled frequency channels of the first protocol and to disable, at least for a predetermined initial time period, at least part of those disabled frequency channels also for the second protocol; and
at least one external device configured to receive an audio stream from the hearing device or to transmit an audio stream to the hearing device, with the audio streaming using one of the protocols, wherein the external device is a contralateral hearing device forming a binaural system with the hearing device, a hearing device to be worn by another user, a phone device, a TV set, a media player, a wireless microphone, a streaming device, a tablet computer, or a personal computer.

13. A method for streaming data to or from a communication device comprising a wireless data interface including a radio transceiver and a controller for controlling the transceiver according to a first frequency hopping protocol comprising a first plurality of frequency channels within a first frequency range and according to a second frequency hopping protocol comprising a second plurality of frequency channels within a second frequency range, wherein the first frequency range and the second frequency range overlap at least in part;
the method comprising:
recognizing, during use of the first protocol, radio interference and temporarily disabling part of the frequency channels for the first protocol, with the disabled frequency channels for the first protocol being stored; and
retrieving the disabled frequency channels of the first protocol and disabling, at least for a predetermined initial time period, at least part of that disabled frequency channels also for the second protocol.

14. The method of claim 13, embodied as instructions on at least one non-transitory computer-readable medium.

* * * * *